United States Patent
Kim et al.

(10) Patent No.: US 11,921,774 B2
(45) Date of Patent: Mar. 5, 2024

(54) METHOD FOR SELECTING IMAGE OF INTEREST TO CONSTRUCT RETRIEVAL DATABASE AND IMAGE CONTROL SYSTEM PERFORMING THE SAME

(71) Applicant: KOREA INSTITUTE OF SCIENCE AND TECHNOLOGY, Seoul (KR)

(72) Inventors: Ig Jae Kim, Seoul (KR); Heeseung Choi, Seoul (KR); Haksub Kim, Seoul (KR); Seungho Chae, Seoul (KR); Yoonsik Yang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 234 days.

(21) Appl. No.: 16/796,943

(22) Filed: Feb. 21, 2020

(65) Prior Publication Data
US 2021/0019345 A1    Jan. 21, 2021

(30) Foreign Application Priority Data
Jul. 19, 2019 (KR) .................. 10-2019-0087526

(51) Int. Cl.
*G06F 16/58* (2019.01)
*G06F 16/2457* (2019.01)
(Continued)

(52) U.S. Cl.
CPC ........ *G06F 16/58* (2019.01); *G06F 16/24578* (2019.01); *G06F 16/51* (2019.01);
(Continued)

(58) Field of Classification Search
CPC ............. G06F 16/5854; G06F 16/51; G06F 16/24578; G06F 16/532
(Continued)

(56) References Cited

U.S. PATENT DOCUMENTS 8,761,512 B1 * 6/2014 Buddemeier ........ G06K 9/6215
382/181
2010/0061658 A1 * 3/2010 Yamada .................. G06T 7/194
382/282
(Continued)

FOREIGN PATENT DOCUMENTS

KR         101033238 B1    5/2011
KR   10-2013-0119288 A   10/2013
(Continued)

OTHER PUBLICATIONS

Sk. Arif Ahmed et al., "Person Re-identification in Videos by Analyzing Spatio-Temporal Tubes," arXiv, 2019, 9 pages, No. 1902.04856.

*Primary Examiner* — Kimberly L Wilson
(74) *Attorney, Agent, or Firm* — CANTOR COLBURN LLP

(57) ABSTRACT

Exemplary embodiments relate to a method for selecting an image of interest to construct a retrieval database including receiving an image captured by an imaging device, detecting an object of interest in the received image, selecting an image of interest based on at least one of complexity of the image in which the object of interest is detected and image quality of the object of interest, and storing information related to the image of interest in the retrieval database, and an image control system performing the same.

11 Claims, 10 Drawing Sheets

(51) Int. Cl.
  *G06F 16/51* (2019.01)
  *G06F 16/532* (2019.01)
  *G06F 16/583* (2019.01)
  *G06T 7/00* (2017.01)
  *G06V 10/98* (2022.01)
  *G06V 20/52* (2022.01)

(52) U.S. Cl.
  CPC ........ *G06F 16/532* (2019.01); *G06F 16/5854* (2019.01); *G06T 7/0002* (2013.01); *G06V 10/993* (2022.01); *G06V 20/52* (2022.01); *G06T 2207/30168* (2013.01); *G06T 2207/30232* (2013.01)

(58) Field of Classification Search
  USPC ........................................................ 707/728
  See application file for complete search history.

(56) References Cited

U.S. PATENT DOCUMENTS

| | | | | |
|---|---|---|---|---|
| 2010/0228437 | A1* | 9/2010 | Hanzawa | B62D 1/28 382/199 |
| 2012/0045090 | A1* | 2/2012 | Bobbitt | G06T 7/97 382/103 |
| 2013/0108152 | A1* | 5/2013 | Deng | G06F 16/5838 382/159 |
| 2013/0279760 | A1 | 10/2013 | Lee et al. | |
| 2015/0032580 | A1* | 1/2015 | Altermatt | G06Q 10/087 705/28 |
| 2015/0043810 | A1* | 2/2015 | Deng | G06T 7/0002 382/159 |
| 2016/0342869 | A1* | 11/2016 | Miyata | H04L 1/0045 |
| 2017/0278289 | A1* | 9/2017 | Marino | G06T 7/536 |
| 2018/0228437 | A1* | 8/2018 | Chen | A61B 5/1036 |
| 2018/0249205 | A1* | 8/2018 | Li | H04N 21/812 |
| 2021/0358121 | A1* | 11/2021 | Bangia | G06N 3/08 |

FOREIGN PATENT DOCUMENTS

| | | |
|---|---|---|
| KR | 1020150024009 A | 3/2015 |
| KR | 101612483 B1 | 4/2016 |
| KR | 1020170068312 A | 6/2017 |
| KR | 101897923 B1 | 10/2018 |
| KR | 101951232 B1 | 2/2019 |
| KR | 1020190046351 A | 5/2019 |
| WO | 2005065283 A2 | 7/2005 |

* cited by examiner

METHOD FOR SELECTING IMAGE OF INTEREST TO CONSTRUCT RETRIEVAL DATABASE AND IMAGE CONTROL SYSTEM PERFORMING THE SAME

CROSS-REFERENCE TO RELATED APPLICATION

This application claims priority to Korean Patent Application No. 10-2019-0087526, filed on Jul. 19, 2019, and all the benefits accruing therefrom under 35 U.S.C. § 119, the contents of which in its entirety are herein incorporated by reference.

BACKGROUND

1. Field

Exemplary embodiments of the present disclosure relate to technology that constructs a retrieval database for image retrieval, and more particularly, to a method for constructing a retrieval database by selecting an image of interest including at least part of an object of interest based on at least one of complexity of the image and quality of the object of interest included in the image, and an image control system for performing the same.

[Description about National Research and Development Support]

This study was supported by the Ministry of Science and ICT, Republic of Korea (Korea Institute of Science and Technology, Project No. 1711094167) under the superintendence of National Research Foundation of Korea.

2. Description of the Related Art

Recently, with the increasing social interest on safety/security, the number of CCTVs installed at roads, alleyways and buildings drastically increases. In this circumstance, the volume of input data in image control systems that receive images from CCTVs has a tendency to geometrically increase. Accordingly, methods for efficiently managing (for example, storing or retrieving) large scale images are required.

An embodiment disclosed by Korean Patent Publication No. 10-2015-0024009 titled "a storage/distribution server for analyzing a camera-captured image in real time, an image control system including the same and a method for operating the same" (published on Feb. 17, 2015) generates and stores metadata by analyzing images acquired from multiple cameras, and when an image retrieval request is received from a user, performs retrieval based on metadata included in the image retrieval request and the stored metadata.

However, in the above-described embodiment, a database that stores metadata is constructed to store metadata for all images, so when the volume of input images increases on a large scale, the retrieval rate reduces.

SUMMARY

According to an aspect of the present disclosure, there is provided an image control system that constructs a retrieval database by selecting an image of interest including at least part of an object of interest based on at least one of complexity of the image and image quality of the object of interest included in the image.

Additionally, there is provided a method for selecting an image of interest to construct a retrieval database and a computer-readable recording medium having the same recorded thereon.

A method for selecting an image of interest to construct a retrieval database, performed by a computing device including a processor, according to an aspect of the present disclosure, includes receiving an image captured by an imaging device, detecting an object of interest in the received image, selecting an image of interest based on at least one of complexity of the image in which the object of interest is detected and image quality of the object of interest, and storing information related to the image of interest in the retrieval database.

In an embodiment, the selecting the image of interest may include: calculating a complexity score of the image by analyzing the entire image in which the object of interest is detected; and comparing the complexity score of the image with a first threshold, and selecting an image having the complexity score that is equal to or higher than the first threshold as the image of interest.

In an embodiment, the selecting the image of interest may include: calculating an image quality score of a region of interest including at least part of the object of interest in the image in which the object of interest is detected; and comparing the image quality score of the region of interest of the image with a second threshold, and selecting an image having the complexity score that is equal to or higher than the second threshold as the image of interest.

In an embodiment, the selecting the image of interest may include calculating a complexity score of the image by analyzing the entire image in which the object of interest is detected, comparing the complexity score of the image with a first threshold, calculating an image quality score of a region of interest including at least part of the object of interest in the image in which the object of interest is detected, comparing the image quality score of the region of interest of the image with a second threshold, and selecting, as the image of interest, an image having the complexity score that is equal to or higher than the first threshold or an image having the complexity score that is equal to or higher than the second threshold.

In an embodiment, a complexity score of the image may be calculated through at least one of a bottom-up approach using at least one of spatial information and temporal information of the image and a top-down approach using information related to the detected object of interest.

In an embodiment, an image quality score of the object of interest may be calculated based on at least one of detection accuracy of the object of interest, an occlusion level of the object of interest, and a distance between the imaging device and the object of interest.

In an embodiment, the detection accuracy of the object of interest may be calculated based on at least one of a percent of the object of interest included in the region of interest, a ratio between background and foreground in the region of interest and a blur of the region of interest.

In an embodiment, the receiving the image may include each of multiple images captured by each of multiple imaging devices. Here, the receiving the image may include receiving a first image captured by a first imaging device and a second image captured by a second imaging device.

In an embodiment, the selecting the image of interest may include selecting the image of interest based on complexity of the first image and image quality of the object of interest of the second image, when the object of interest is detected in the first image and the second image.

In an embodiment, the selecting the image of interest may include selecting the image of interest based on complexity of the first image, image quality of the object of interest of the first image, complexity of the second image and image quality of the object of interest of the second image, when the object of interest is detected in the first image and the second image.

A computer-readable recording medium according to another aspect of the present disclosure is readable by a computing device, and stores program instructions executable by the computing device. Here, when the program instructions are executed by a processor of the computing device, the program instructions cause the processor to perform the method for selecting an image of interest to construct a retrieval database.

An image control system according to still another aspect of the present disclosure includes at least one imaging device that images an object and a background, a server that selects, as an image of interest, an image having a possibility that a user will retrieve later in the image received from the imaging device, and a first database constructed using the image of interest.

In an embodiment, the image control system may include further a second database constructed using an image that is not selected as the image of interest in the received image.

The image control system according to an aspect of the present disclosure receives large scale images, and selects, as an image of interest, an image including at least part of an object of interest from the received images to construct a retrieval database.

Particularly, the system may select, as the image of interest, an image substantially worth retrieving from a few hundred or thousand input images or a few tens of thousands of input images per second through large scale CCTVs, by analyzing the input images from a macro perspective (such as, for example, calculation of complexity of the entire image) and/or a micro perspective (such as, for example, calculation of image quality of a region of interest including the object of interest included in the image).

When the retrieval database is constructed through this selection process, there is a reduction in search space required for a user to retrieve an image including a desired search target later, thereby allowing the user to retrieve the desired image faster. Further, since the retrieval database is constructed using images having a substantially high possibility of being retrieved, it is possible to efficiently use the storage space.

The effects of the present disclosure are not limited to those mentioned above, and these and other effects will be clearly understood by those skilled in the art from the appended claims.

BRIEF DESCRIPTION OF THE DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure only and are not intended to be limiting of the present disclosure. Additionally, for clarity of description, the accompanying drawings may show variously modified elements such as exaggerated and omitted elements.

DETAILED DESCRIPTION

The terminology used herein is for the purpose of describing particular embodiments only and is not intended to be limiting of the present disclosure. As used herein, the singular forms include the plural forms as well, unless the context clearly indicates otherwise. The term "comprises" or "includes" when used in this specification, specifies the presence of stated features, regions, integers, steps, operations, elements, and/or components, but does not preclude the presence or addition of one or more other features, regions, integers, steps, operations, elements and/or components.

Unless otherwise defined, all terms (including technical and scientific terms) used herein have the same meaning as commonly understood by one of ordinary skill in the art. It will be understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

Hereinafter, the embodiments of the present disclosure will be described in detail with reference to the accompanying drawings.

Figure 1:
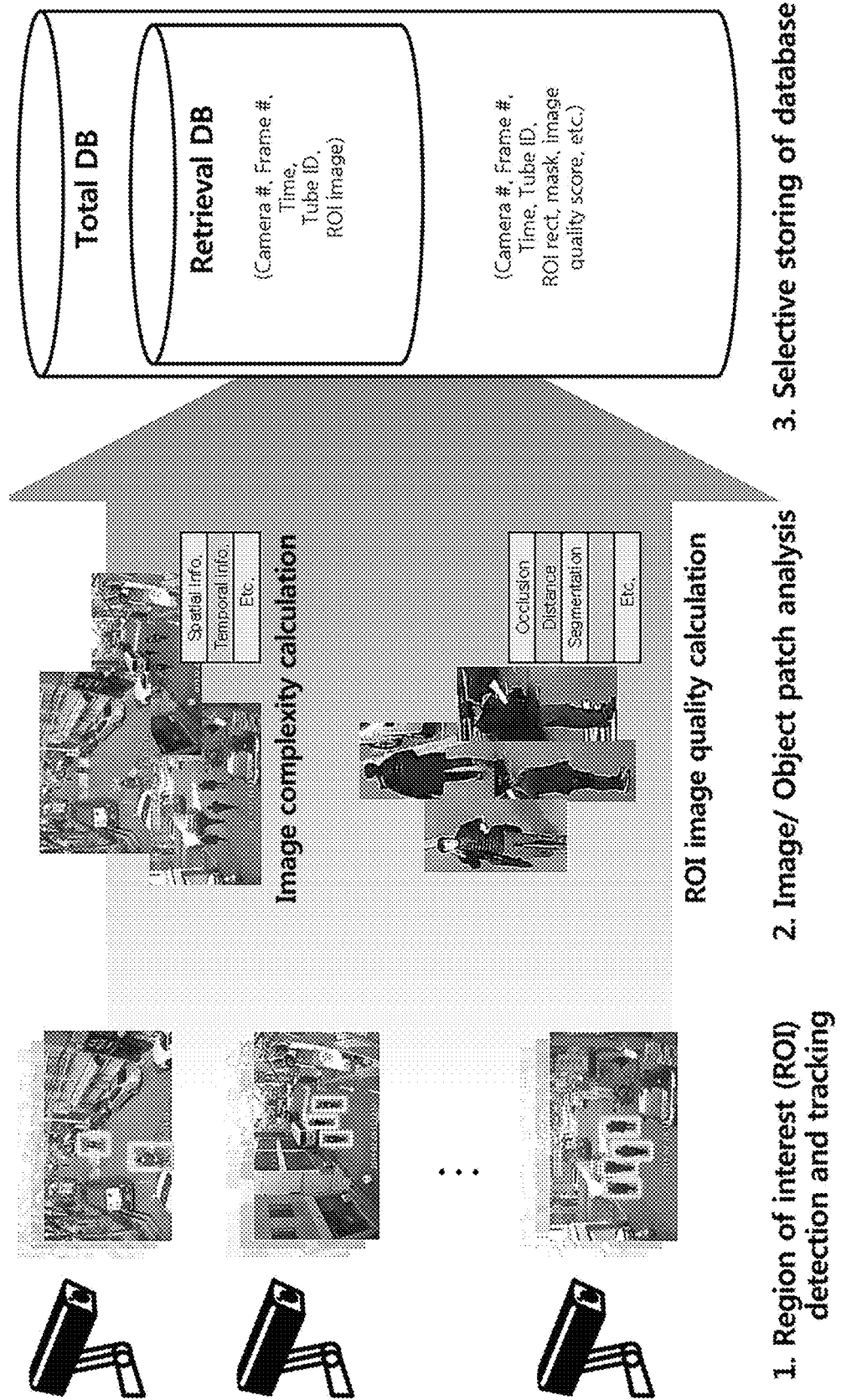
FIG. 1 is a conceptual diagram of a system that stores large scale images according to an embodiment of the present disclosure.

FIG. 1 is a schematic diagram of the operation of an image control system according to an embodiment of the present disclosure.

The image control system according to embodiments of the present disclosure receives images captured by at least one imaging device from a server. The server detects an object of interest corresponding to a target candidate for which a user intends to search in the received images. The search target is a target that the user wants to see later. There is a high possibility that the user will retrieve an image including the search target.

Subsequently, a retrieval database is constructed based on an image having at least part of the object of interest in the received images. Particularly, to provide a higher quality image retrieval service, an image of interest is selected based on an analysis result of the entire region of the image (for example, complexity analysis of the entire region of the image) and/or an analysis result of some regions of the image (for example, quality analysis of Object image (such as Object patches of fames), in particular a region of interest (ROI) image having the object of interest), and a retrieval database is constructed using image data and/or detailed information of the selected image of interest. In some embodiments, image data and/or detailed information of an unselected image is stored in a secondary database that supports a retrieval service.

Figure 2:
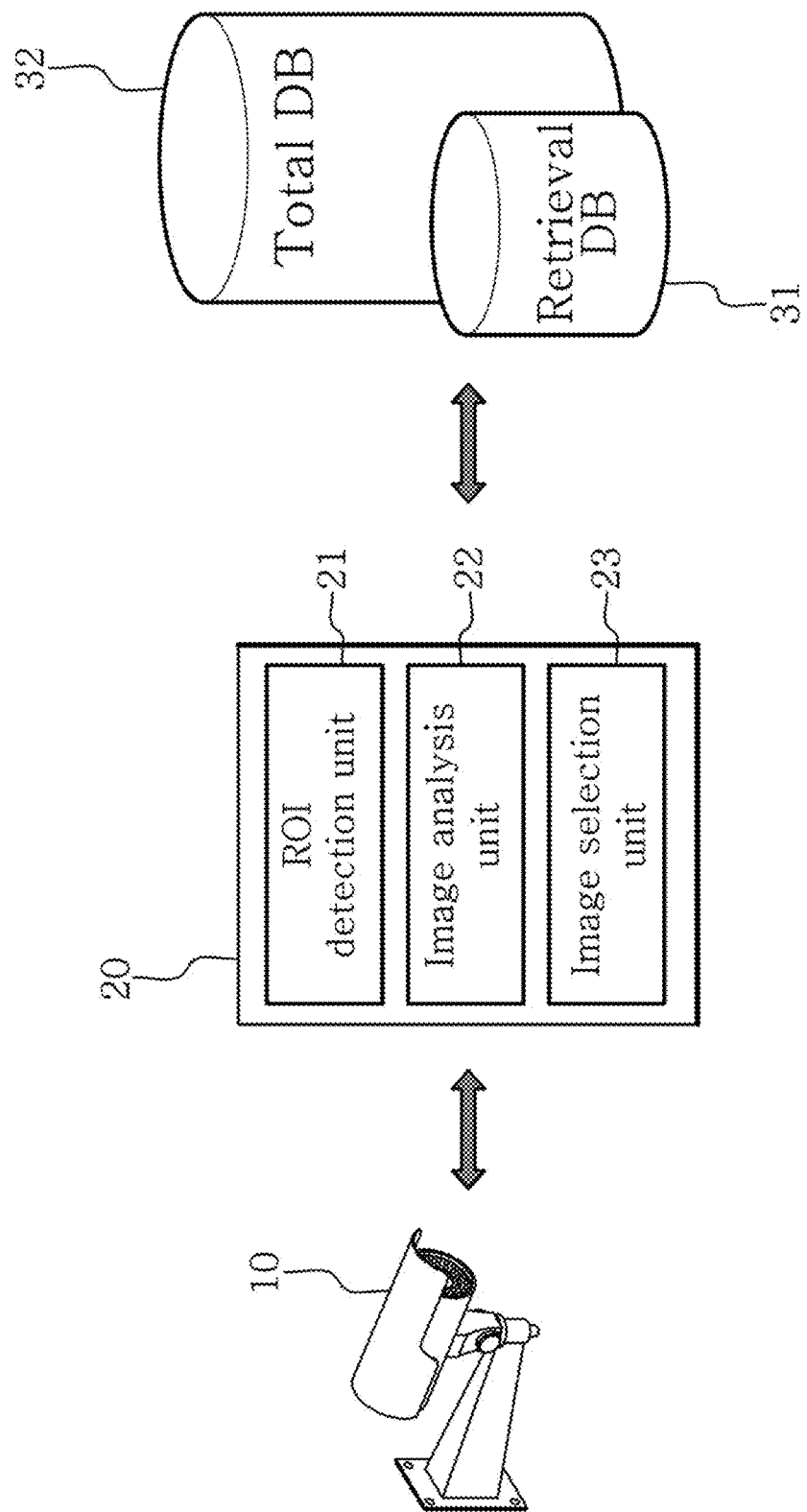
FIG. 2 is a conceptual diagram of a method for storing large scale images, performed by the system of FIG. 1 according to an embodiment of the present disclosure.

FIG. 2 is an architecture diagram of the image control system according to an embodiment of the present disclosure.

Referring to FIG. 2, the image control system 1 includes at least one imaging device 10, a server 20 and a retrieval database 31. In some embodiments, the image control system 1 may further include a total database 32 to further store images or related information that are not stored in the retrieval database 31.

The image control system 1 according to embodiments may have aspects of entirely hardware, or entirely software, or partly hardware and partly software. For example, the image control system 1 may refer collectively to hardware with data processing capability and operating software for operating the hardware. The term "unit", "module", "device" or "system" as used herein is intended to refer to a combination of hardware and software that is executed by the corresponding hardware. For example, the hardware may refer to a computing device capable of processing data, including a Central Processing Unit (CPU), a Graphic Processing Unit (GPU) or a processor. Additionally, the software may refer to a process being executed, an object, an executable, a thread of execution and a program.

The at least one imaging device 10 is installed at a place where a control service of the image control system 1 is provided, and is connected to the server 20 via a wired/wireless network. The imaging device 10 is configured to generate image data or video data by imaging a situation in the coverage area. The imaging device 10 includes various types of devices. For example, the imaging device 10 includes, but is not limited to, a digital CCTV, an analog CCTV, a smartphone and a black box.

In some embodiments, each imaging device 10 generates image data further including identification information (for example, an identifier) of the imaging device 10, time, and identification information of the corresponding image. For example, when the CCTV 10 generate a video by imaging a situation in the coverage area, the video data may include a video frame, an identifier of the corresponding CCTV 10, a frame identifier and time.

The server 20 is multiple computer systems or computer software implemented as a network server, and is configured to receive the images generated by the multiple imaging devices 10 via the wired/wireless network. Here, the network server refers to a computer system and computer software (a network server program) connected to a sub-device that can communicate with other network server via a computer network such as a private Intranet or an Internet to receive a task execution request, execute the corresponding task and provide an execution result. However, in addition to the network server program, the network server should be understood as a broad concept including a series of applied programs that run on the network server, and in some instances, various types of databases constructed inside.

The server 20 selects, as an image of interest, an image having a possibility that the user will retrieve later in the received images, and constructs the retrieval database 31 using the image of interest.

In an embodiment, the server 20 selects an image representing at least parts of an object of interest in the received images. The object of interest is a search target candidate having a possibility of becoming a search target among objects present in the image in the user's image retrieval. The image representing at least parts of the object of interest includes an object patch extracted from a frame of video. Herein, the image representing at least parts of the object of interest may be called the image of the object of interest.

In the image control system 1, the object of interest may be freely set according to the nature of the image control system 1.

In an embodiment, the object of interest is a target that the user intends to identify through the image, and may include at least part of foreground in the image. The object of interest includes, but is not limited to, a moving object, for example, a vehicle and a person. The vehicle includes, but is not limited to, a car, a motorcycle, a handcart and a bike.

Any object other than the object of interest may be included in the background. For example, in case that a person is the object of interest, a car may be regarded as the background.

Additionally, in some embodiments, the object of interest may be an object to which different standards are further applied depending on the purpose of the image control system 1 or the user.

A standard for a particular object type may be further applied to the object of interest as a detail standard. The object type corresponds to a class used to identify an object such as a person and a car. For example, when the standard for the particular object type is further applied, only a car may correspond to the object of interest.

Alternatively, a standard for a particular object characteristic may be further applied as the detail standard. The object characteristic may be an intrinsic property of the object such as shape, color and surface. For example, when the standard for the particular object characteristic is further applied, only an object having a particular visible range of colors may correspond to the object of interest.

Alternatively, the object of interest may rely on a user input. In this case, the user input may include a feature component for object identification, or a particular image into which a feature component of a particular object is incorporated.

Based on the user's tendency to retrieve an image including a particular search target from the retrieval database later when necessary (for example, suspect search, missing child search, etc.), in general, the image including the object of interest is an image worth searching for the purpose of retrieval. In contrast, an image with no object of interest (for example, an image including only background) has a very high possibility that the user's search target is absent in it. Accordingly, when the retrieval database 31 is constructed based on the image including the object of interest, the search distance reduces and image retrieval is faster.

In an embodiment, the server 20 includes an object of interest detection unit 21, an image analysis unit 22 and an image selection unit 23.

The object of interest detection unit 21 detects the object of interest for image selection.

In an embodiment, the object of interest detection unit 21 detects a region of interest including at least part of the object of interest to detect the object of interest. That is, detection of the object of interest corresponds to detection of the region of interest.

The object of interest detection unit 21 detects the region of interest through various region detection schemes. The region detection scheme includes, for example, Haar, Convolutional Neural Network (CNN), Scale Invariant Feature Transform (SIFT), Histogram of Oriented Gradients (HOG), Neural Network (NN), Support Vector Machine (SVM) and Gabor schemes, but is not limited thereto, and may include a region detection scheme for fulfilling the purpose of operation of the image control system 1.

In an example, the object of interest detection unit 21 may detect the object of interest by generating candidate boxes of the region of interest through a sliding window or a Region proposal scheme, and applying each candidate box to a pre-trained object of interest detection model.

Here, the object of interest detection model is an object of interest detection model having a CNN structure, trained by a deep learning algorithm, and is trained to detect an object of interest or an object of non-interest in the input image.

The object of interest detection model is pre-trained in machine learning on multiple training samples, and each training sample includes a training image having the object of interest.

The object of interest detection model extracts a feature from the input image and outputs a feature vector based on the extracted feature. The object of interest detection model may be further configured to score the output feature vector for use to classify the class of the object of interest.

Additionally, the object of interest detection model may be further trained to derive more detailed information associated with the object of interest included in the input image. For example, the object of interest detection model may be trained to classify a predetermined type of the object of interest, for example, a person and a car. In this case, for example, the object of interest detection model may detect the object of interest, and further generate the type of the detected object of interest. To this end, each training sample may further include type information of the object of interest.

In some embodiments, when the object of interest detection model is further trained on the region of interest, each training sample may further include information associated with the region of interest in the training image.

When the object of interest detection unit 21 detects the object of interest, the object of interest detection unit 21 may further generate detailed information of the detected object of interest. In an embodiment, the object of interest detection unit 21 may further generate color, shape and type of the object of interest as the detailed information based on the extracted feature for object detection. Additionally, the detailed information may further include a detector used to detect the region of interest and a mask of the region of interest.

In an embodiment, the object of interest detection unit 21 may generate image data by extracting a region including at least part of the detected object of interest. For example, the object of interest detection unit 21 may generate image data of the region of interest.

Additionally, when the object of interest detection unit 21 receives a video, the object of interest detection unit 21 may further generate tracking data and detailed information by tracking the object of interest in the video. In this case, the object of interest detection unit 21 tracks the object of interest by identifying if the objects of interest present in each frame that makes up the video are the same object of interest. The object of interest detection unit 21 may track the object of interest based on the extracted feature for object detection.

Additionally, the object of interest detection unit 21 may extract an image of the tracked object of interest from the video frame. Additionally, the object of interest detection unit 21 may generate tube data composed of the image of the region of interest. In this case, the object of interest detection unit 21 may further generate an identifier of the tube data.

As described above, the object of interest detection unit 21 may detect the object of interest and generate data including the detected object of interest, and further generate detailed information to store in the retrieval database 31 together with image data.

The server 20 selects the image of interest by analyzing the entire region (for example, all frames) of the image in which the object of interest is detected from a macro perspective, or by analyzing some regions (for example, the region of interest) of the image from a micro perspective.

In an embodiment, the image analysis unit 22 determines complexity of the image in which the object of interest is detected by analyzing the entire region of the image. The complexity of the image relies on the number of objects. For example, when many people are present in the image, the corresponding image may be determined to have high complexity. Here, the object is not limited to the object of interest.

The image analysis unit 22 is configured to calculate the complexity of the image using various image analysis schemes to analyze components that make up the image.

In an embodiment, the image analysis unit 22 calculates the complexity of the image through a bottom-up approach.

The bottom-up approach calculates the complexity for basic components (low-level features) of the entire image, and the bottom-up approach is performed to calculate the complexity for spatial information and/or temporal information of the image.

In the bottom-up approach, the complexity for spatial information is calculated by analyzing the basic components such as brightness, color, depth and spatial frequency in the image. The image analysis unit 22 is configured to calculate the complexity for spatial information through an image component analysis scheme related to various bottom-up approaches.

Figure 3:
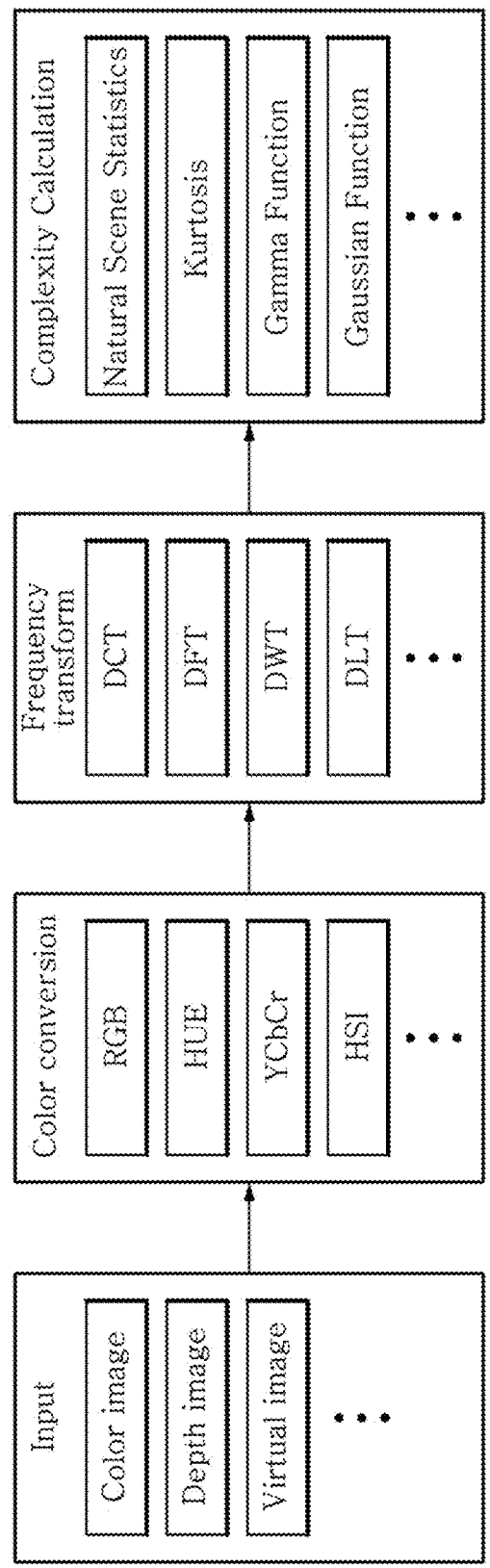
FIG. 3 is a diagram illustrating a process of calculating complexity for spatial information in a bottom-up approach according to an embodiment of the present disclosure.

FIG. 3 is a diagram illustrating a process of calculating the complexity for spatial information in the bottom-up approach according to an embodiment of the present disclosure.

Referring to FIG. 3, the bottom-up approach for calculating the complexity for spatial information calculates the complexity for spatial information from the input image.

The input for complexity analysis for spatial information may include a color image, a depth image and a virtual image generated by 3D modeling or computer graphics. To this end, the image control system 1 may further include a device for acquiring each image information. For example, the depth image may be an image acquired through a device (for example, a depth sensor or a 3-dimensional RGB-D sensor) configured to acquire depth information, or an image based on depth information further acquired through pre-stored depth map estimation.

In some embodiments, data processing of color conversion and/or frequency transform may be performed on the input image. The color conversion or frequency transform may be performed or not according to the type and purpose of the input image.

The color conversion includes performing data processing on the input image according to the conversion technique such as, for example, RGB, HUE, YCbCr, HIS. As a result of the color conversion, brightness and color of the image is used to calculate the complexity.

The frequency transform is performed on the input data according to the transform technique such as, for example, Discrete Cosine Transform (DCT), Discrete Fourier transform (DFT), Discrete Wavelet Transform (DWT) and Discrete Laplacian Transform (DLT). Various spatial frequency components are calculated by the frequency transform, and as a result of the frequency transform, the spatial frequency components are used to calculate the complexity. In some embodiments, the frequency transform is performed after the color conversion.

The complexity for spatial information of the image is calculated by analyzing the data processed image or the input image, for example, through Natural Scene Statistics, Kurtosis, Gamma Function and Gaussian Function.

For example, the spatial frequency component is acquired by frequency transform processing of the image, and the complexity for spatial information of the corresponding image may be calculated through DWT, Gaussian and Gamma Function.

The complexity calculation scheme of the image analysis unit 22 through the bottom-up approach is not limited to the above-described examples, and it will be obvious to those skilled in the art that a variety of other schemes may be used.

In the bottom-up approach, the complexity for temporal information is calculated through analysis of motion related components such as quantity, speed, direction and temporal frequency of motion in the image. The image analysis unit 22 is configured to calculate complexity for temporal information through an image component transformation technique related to various bottom-up approaches.

Figure 4:
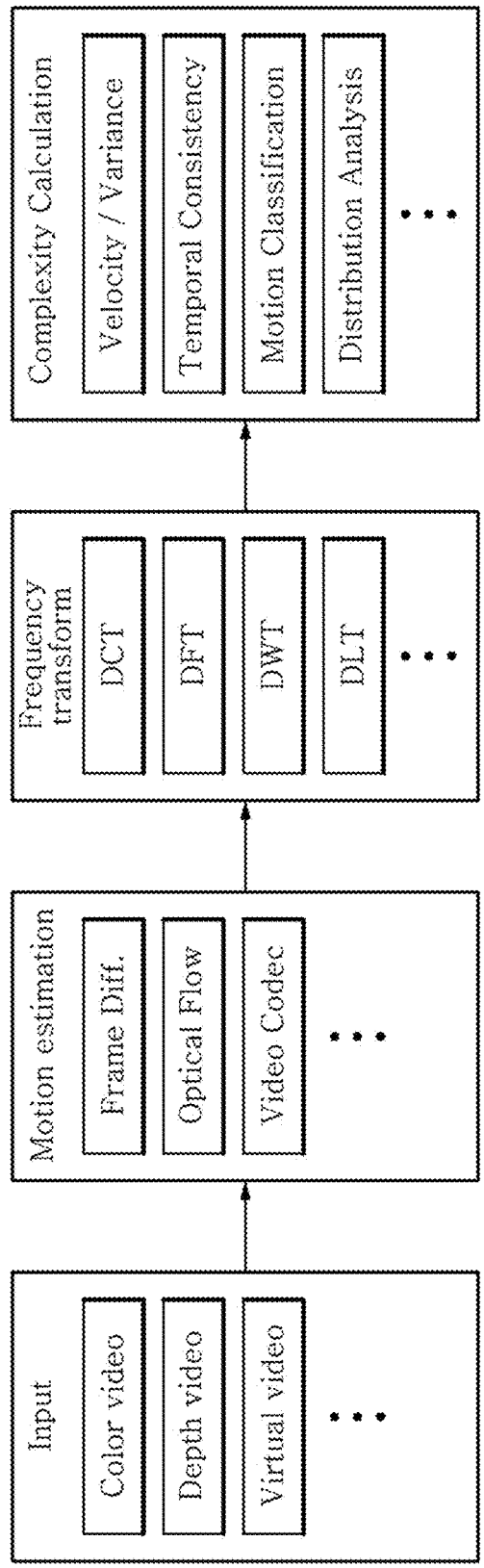
FIG. 4 is a diagram illustrating a process of calculating complexity for temporal information in a bottom-up approach according to an embodiment of the present disclosure.

FIG. 4 is a diagram illustrating a process of calculating the complexity for temporal information in the bottom-up approach according to an embodiment of the present disclosure.

Referring to FIG. 4, the bottom-up approach for calculating the complexity for temporal information acquires temporal information of the image through motion estimation in the input image, and calculates the complexity for temporal information of the corresponding image.

The input for complexity analysis for temporal information includes, but is not limited to, a color video, a depth video and a virtual video generated by 3D modeling or computer graphics. Various types of videos may be used as the input video.

The motion estimation analyzes the temporal information in the input video based on a difference between successive video frames, an optical flow and inter frame motion estimation, but is not limited thereto. The temporal information of the corresponding image may be acquired by various types of motion estimation techniques.

In some embodiments, frequency transform may be further performed on the acquired temporal information. The frequency transform may not be performed according to the type and purpose of the input video.

The frequency transform may be performed on the input data according to the transform technique such as, for example, Discrete Cosine Transform (DCT), Discrete Fourier Transform (DFT), Discrete Wavelet Transform (DWT) and Discrete Laplacian Transform (DLT). Various spatial frequency components are calculated by frequency transform, and as a result of the frequency transform, the spatial frequency components are used to calculate the complexity.

The complexity for temporal information of the image is determined by calculating motion speed in the video, variance, temporal consistency and motion classification in the data processed temporal information, the acquired temporal information or the input video. Alternatively, the complexity for temporal information of the image is calculated by analyzing through various temporal information distribution analysis in the data processed temporal information, the acquired temporal information or the input video. Here, the temporal information distribution analysis includes, but is not limited to, Natural Scene Statistics, Kurtosis, Gamma Function and Gaussian Function.

For example, frequency transform is performed on temporal information in the video, and complexity for temporal information of the corresponding video may be calculated through directional energy and directional variance of the temporal frequency based on DFT of the temporal frequency components.

In other embodiment, the image analysis unit 22 calculates the complexity of the image by analyzing the image through a top-down approach.

The top-down approach detects and tracks the object of interest, and calculates complexity for temporal information of the object, the number of objects and the number of object types. The calculated complexities of various aspects are combined and calculated as the complexity of the image.

Figure 5:
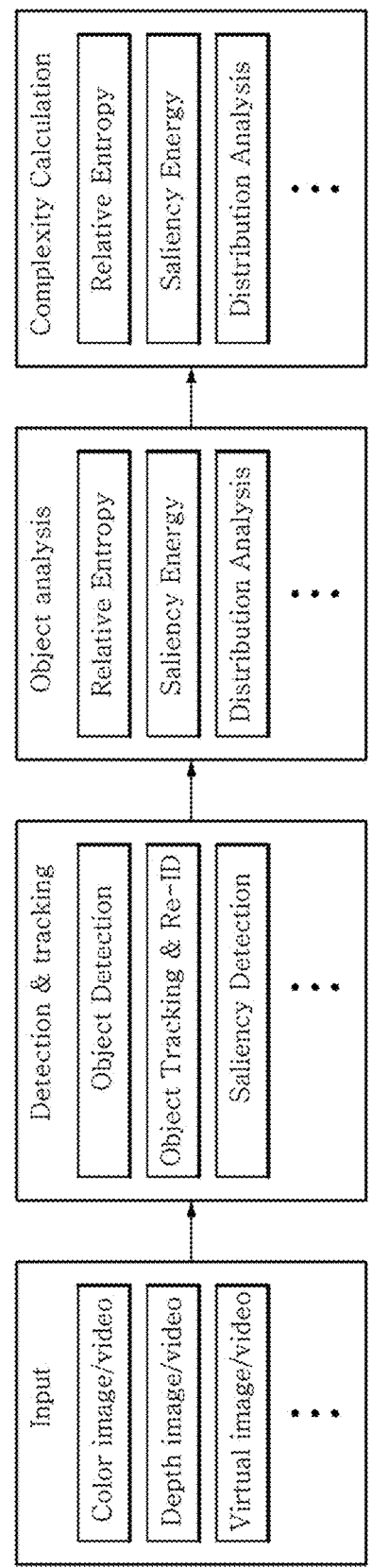
FIG. 5 is a diagram illustrating a process of calculating complexity in a top-down approach according to an embodiment of the present disclosure.

FIG. 5 is a diagram illustrating a process of calculating the complexity in the top-down approach according to an embodiment of the present disclosure.

Referring to FIG. 5, the top-down approach analyzes the object through an object detection and tracking technique, and calculates complexity based on the object analysis result.

In the top-down approach, the input for complexity analysis may include, but is not limited to, a color image, a depth image and a virtual image generated by 3D modeling or computer graphics.

The object detection and tracking in the input image includes objection detection, tracking, re-identification and saliency detection, and but is not limited thereto and may various detection/tracking techniques.

After the object is detected and tracked, a component of the object is analyzed. The component of the object includes, for example, size, type, number and motion, but is not limited thereto.

In the top-down approach, the complexity of the input image is calculated based on the analyzed object information (for example, component information of the detected and tracked object).

In an embodiment, in the top-down approach, the complexity is calculated, for example, through Relative Entropy, saliency energy in the image or distribution analysis. Here, the distribution analysis includes, but is not limited to, Natural Scene Statistics, Kurtosis, Gamma Function and Gaussian Function.

For example, the object may be detected and tracked from the input image through saliency energy based detection, and the complexity may be calculated based on the size, color and temporal information of the object.

In some other embodiments, the image analysis unit 22 may be configured to calculate the complexity of the image by analyzing the image through the bottom-up approach and the top-down approach.

As described above, the image analysis unit 22 is configured to use both the bottom-up approach and the top-down approach, or selectively use a particular approach according to the type and the purpose of use of the object of interest.

The image analysis unit 22 may score the complexity analysis result according to the bottom-up approach and/or the top-down approach. The scoring of the analysis result is referred to as a complexity score of the input image.

The complexity score may be variously calculated. In an example, the complexity score of the image may be an analysis result value (for example, a Gamma Function value) itself. In other example, the complexity value of the image may be a converted value of the analysis result into a scale range (for example, normalized a Gamma Function value to a particular range). In this case, various normalization methods that normalize one or more analysis result values having various ranges to a particular range (for example, z-normalization) may be used.

In an embodiment, the image analysis unit 22 is configured to analyze the image quality of the region (for example, the region of interest) including at least part of the object of interest detected by the object of interest detection unit 21, and calculate the image quality analysis result of the corresponding region.

In some embodiments, when the region of interest is detected for detection of the object of interest, the image quality of the region of interest is analyzed as the image quality of the object of interest. To this end, the image analysis unit 22 analyzes the image quality using the image of the region of interest (for example, a patch of the region of interest). Hereinafter, for clarity of description, the image quality analysis operation will be described in detail based on analysis of the image quality of the region of interest as the image quality of the object of interest.

The image analysis unit 22 analyzes the image quality of the region of interest based on detection accuracy, occlusion in the object of interest and the distance between the object of interest and the imaging device.

With the decreasing region of the object of interest that is not included in the image of the region of interest, detection accuracy is higher. Additionally, as background included in the image of the object of interest is less, detection accuracy is higher. That is, the image analysis unit 22 is configured to have low detection accuracy when the image of the object of interest (or the image of the region of interest) includes a large amount of background, or part of the object of interest is not included, causing inaccuracy.

To this end, the image analysis unit 22 analyzes the detection accuracy of the object of interest through various image processing techniques based on foreground information and background information in the image of the region of interest.

In an embodiment, the image analysis unit 22 calculates the detection accuracy of the object of interest based on a percent of the object of interest included in the region of interest, a ratio between background and foreground in the region of interest and a blur of the region of interest.

The image analysis unit 22 calculates the percent of the object of interest included in the region of interest using a detection accuracy model. The detection accuracy model may be a deep learning based model having a CNN structure.

For example, the image analysis unit 22 applies the image of the region of interest as the input image to an object percent model pre-trained in deep learning. The object percent model extracts a feature from the image of the object of interest, outputs a feature vector, and scores the output feature vector for use to classify the class of the object of interest in the image of the region of interest. The feature vector score corresponds to the percent of the object of interest included in the region of interest. The score calculation may be performed by the unit of pixel, or in a predetermined region composed of a plurality of pixels.

The object percent model is configured and trained in a similar way to the object of interest detection model, but they may be different. In an embodiment, the object of interest detection model is trained on images including multiple objects, while the object percent model may be trained on images including a single object.

When the full object of interest is included in the image of the region of interest, the object percent model has a feature vector score corresponding to high classification performance. In contrast, when part of the object of interest is included in the image of the region of interest, the object percent model has a feature vector score corresponding to low classification performance.

The percent of the object of interest included in the region of interest is calculated based on the feature vector score of the object percent model.

In other embodiment, the image analysis unit 22 separates background and foreground in the image in which the object of interest is detected, and calculates a ratio of the separated foreground region using the following equation.

$$(W_{fg} \times H_{fg})/(W \times H) \qquad \text{[Equation 1]}$$

Here, W, H denote the horizontal/vertical dimensions of the entire region of the image in which the object of interest is detected, and Wfg, Hfg denote the horizontal/vertical dimensions of the foreground region.

When multiple objects are included as the foreground over the entire region of the image in which the object of interest is detected, each ratio for each object is calculated. In this instance, various object detection techniques may be used to separate the foreground and the background. Here, the object corresponding to the foreground includes any object in which the user is interested, for example, a person and a car, and is not limited to a particular object.

Additionally, to analyze the detection accuracy, the image analysis unit 22 may analyze whether the image of the region of interest is clear or blurry.

In an embodiment, the image analysis unit 22 may analyze whether the image of the region of interest is clear or not, or how clear the image of the region of interest is, through the wavelet or Laplacian algorithm. In other embodiment, the image analysis unit 22 may analyze whether the image of the region of interest is clear or not, or how clear the image of the region of interest is, by inputting the image of the region of interest to a pre-trained image blur model.

The image blur model is a deep learning based CNN model, and is trained using a clear training image or a blurry training image.

In this case, how clear or blurry the image of the object of interest is may be calculated based on a value based on the feature vector outputted from the CNN model.

As described above, the image analysis unit 22 may calculate the detection accuracy of the object of interest by analyzing the image including at least part of the object of interest in various aspects.

In an embodiment, after normalizing the components (for example, a coverage score, a ratio score and a clearness score) having a plurality of different scale values, the detection accuracy may be scored based on each normalized component value. For example, after normalization through z-normalization, the detection accuracy may be scored as an average of each normalized component value and a weighted average.

Here, the weight of each component may be related to user convenience in retrieving the image and providing to the user. For example, even though a large amount of background is included, the user does not feel inconvenient in seeing the retrieved image, but if the image is not clear, it may be inconvenient. In this case, the weight of the clearness score may be higher than the weight of the background score.

The image analysis unit 22 analyzes the occlusion level of the object of interest in the image of the region of interest based on a local feature in the image of the object of interest.

When there is no occlusion in the region of interest, and thus, the object of interest is fully detected, the corresponding image has a low occlusion level. On the contrary, with the increasing region in which the object of interest is not detected due to occlusion, the corresponding image has a high occlusion level. Here, the high/low occlusion levels are not particularly defined, and they refer to opposite values.

In an example, when the object of interest is a person, the image analysis unit 22 analyzes an occlusion phenomenon using skeleton information.

The image analysis unit 22 calculates the distance between the object of interest in the corresponding image and the imaging device 10 based on depth information of the image of the object of interest. When the object of interest is at a long distance from the imaging device 10, the image analysis unit 22 gives a low weight. In some embodiments, the long distance may rely on the resolution of the imaging device.

In an example, when the imaging device 10 (such as, for example, a camera with a depth sensor) is configured to generate depth information, the image analysis unit 22 calculates the distance based on the depth information provided from the imaging device 10. In other example, when the imaging device 10 does not generate depth information, the image analysis unit 22 calculates the distance through various depth prediction algorithms or a pre-stored depth table. Here, the depth table is a table that records distance information according to the pixel size of the object in the image. The depth table may be recorded by a user input or normalization.

The image analysis unit 22 calculates an image quality score of the object of interest based on the quality analysis result of the image of the object of interest (i.e., the image of the region of interest).

In an embodiment, the image quality score of the object of interest is calculated based on at least one of detection accuracy of the object of interest, the occlusion level of the object of interest and the distance between the imaging device and the object of interest. Here, the detection accuracy of the object of interest is calculated based on the percent of the object of interest included in the region of interest, the ratio between background and foreground in the region of interest and the blur of the region of interest.

The information calculated by the image analysis unit 22 may be stored in the retrieval database 31 together with the selected image. For example, the above-described detailed information may further include information related to the image quality of the region of interest (for example, the image quality score, the detection accuracy and the ratio between background and foreground).

The image selection unit 23 selects the image of interest substantially worth searching in the user's image retrieval operation later in the received images.

In an embodiment, the image selection unit 23 selects the image of interest worth searching in the retrieval process based on at least one of the complexity score of the image and the image quality score of the object of interest.

In the above embodiment, when the server 20 calculates the complexity score of the image, the image selection unit 23 compares the calculated complexity score with a first threshold α. An image having the complexity score that is equal to or higher than the first threshold α may be selected as the image of interest.

In general, there is a high possibility that as complexity is high, an occlusion phenomenon and an error in the detected object (or region) is high.

For example, when an image represents a situation in which there are a large number of people, the complexity score of the corresponding image is calculated high. The shape of at least one person in the image is partially displayed due to occlusion caused by the shape of other person.

Additionally, people usually move in this situation. As a result, blurs may occur, and (pose induced) detection errors of the object of interest may occur. When the image quality of the object of interest in this image is analyzed, a relatively low image quality score is calculated.

However, in some instances, there is a possibility that an image having high complexity includes the user's desired event. For example, a situation in which a particular suspect walks in the crowd of people may be the user's desired event. As described above, the image having high complexity may have low image quality of the object of interest, but a possibility of being used to retrieve.

The system 1 selects the image of interest using the first threshold α to prevent the omission of such images in the construction of the retrieval database 31.

The first threshold α may rely on a statistical value acquired through the complexity analysis result of a plurality of previous sample images. The statistical value is set based on the complexity analysis result of the plurality of previous sample images. In some embodiments, the first threshold α may further rely on the type of the object of interest.

Additionally, in the above embodiment, when the server 20 calculates the image quality score of the object of interest, the image selection unit 23 compares the calculated image quality score with a second threshold β. An image having the image quality score that is equal to or higher than the second threshold β may be selected as the image of interest.

The image having the image quality score that is equal to or higher than the second threshold β is an image substantially worth searching in the retrieval process since it is an image including the fully detected object of interest with less occlusion or blur phenomenon in the image in which the object of interest is detected.

An image having the image quality score that is less than the second threshold β corresponds to an image that the user excludes from the search target even though it is retrieved and provided. Accordingly, the image having the image quality score that is less than the second threshold β may be determined to be an image that is searched with a substantially low probability in the retrieval process. The second threshold β is a statistical value that relies on the output specifications of the user client's output device (for example, a display) provided with a retrieval service or imaging specifications of the imaging device 10.

Various selection operations of the image analysis unit 22 and the image selection unit 23 will be described in more detail with reference to FIGS. 6 to 10 below.

The operations (for example, calculation of the complexity score and comparison with the first threshold, calculation of the image quality score and comparison with the second threshold) of the image analysis unit 22 and the image selection unit 23 are not limited to the above-described embodiments.

For example, when there is a high possibility that an occlusion phenomenon will occur or an error in the detected object of interest (or the region of interest) will be large, the complexity score may have a lower value. In this case, an image having the complexity score that is less than the first threshold may be selected. Alternatively, when the image quality is high, the image quality score may have a lower value. In this case, an image having the complexity score that is less than the second threshold may be selected.

The image control system 1 selects, as the image of interest, an image worth searching in order to retrieve a particular image desired by the user. The selected image of interest or information related to the image of interest is stored in the retrieval database 31.

The retrieval database 31 may be a computing device that can use information of an external database such as a cloud server. In this case, the server 20 may be further configured to perform data communication by accessing the external retrieval database 31 in response to the user's instructions.

When the retrieval database 31 receives a retrieval request for a particular image from the user client (not shown), the operation of retrieving the particular image is performed first. Information (or data) stored in the retrieval database 31 refers to a set of lots of structured, unstructured or semi-structured data, and the structured data is data stored in a fixed field, and includes, for example, a relational database and a spreadsheet. Additionally, the unstructured data is data that is not stored in a fixed field, and includes, for example, text document, image, video, audio data. Additionally, the semi-structured data is data that is not stored in a fixed field, but includes metadata or schema, and the semi-structured data includes, for example, XML, HTML, and text.

In an embodiment, the retrieval database 31 includes image data of the selected image of interest, identification information of the selected image, identification information of the imaging device used to capture the selected image of interest, location information of the imaging device, time information, image data of the object of interest and object of interest identification information.

The identification information of the imaging device 10 includes an ID of the imaging device 10. The location information of the imaging device 10 includes an installation place. Additionally, the location information of the imaging device 10 may further include a coverage area.

The image data of the object of interest and the object of interest identification information is generated based on the detection result of the object of interest. For example, the image data of the object of interest includes image data of the region of interest, and the object of interest identification information includes a tube ID by the detection result of the object of interest.

When receiving a retrieval request including retrieval conditions (such as characteristics of a target object), the system 31 including such the retrieval database 31 provides the user with the image data of the object of interest by retrieving the image data of the object of interest matching with the said retrieval conditions.

Additionally, the image control system 1 may store an image that is not selected as the image of interest in the total database 32 that is a secondary database. The total database 32 may be a computing device that can use information of an external database such as a cloud server.

The image used to construct the total database 32 includes an image in which the object of interest is not detected, and an image in which the object of interest is detected but analyzed as not worth searching later at a macro level and/or a micro level.

The image in which the object of interest is not detected or related information includes, for example, image data, identification information of the corresponding image, identification information of the imaging device used to capture the corresponding image, location information of the imaging device and time information, but is not limited thereto.

The image analyzed as being not worth searching or related information further includes, for example, related information generated in the process of detecting the region of interest (for example, the detector, the mask of the region of interest, the image quality score of the region of interest, etc.) but is not limited thereto.

FIG. 2 shows that each element 20, 31, 32 of the system 1 is physically separated, but is not limited thereto. For example, the retrieval database 31 and the total database 32 are a single database, and each database 31, 32 may be constructed as a logically separated, single database server.

It is obvious to those skilled in the art that the image control system 1 or the elements 10, 20 may include other elements not described herein. For example, the image control system 1 or the elements 10, 20 may further include a data input device, a display, an output device such as a printer, a storage device such as memory, a network, a network interface and protocol.

The image control system 1 performs a method for selecting an image of interest to construct a retrieval database including a series of steps of constructing the retrieval database 31 by receiving images from the at least one imaging device 10 and selecting the image of interest.

Figure 6:
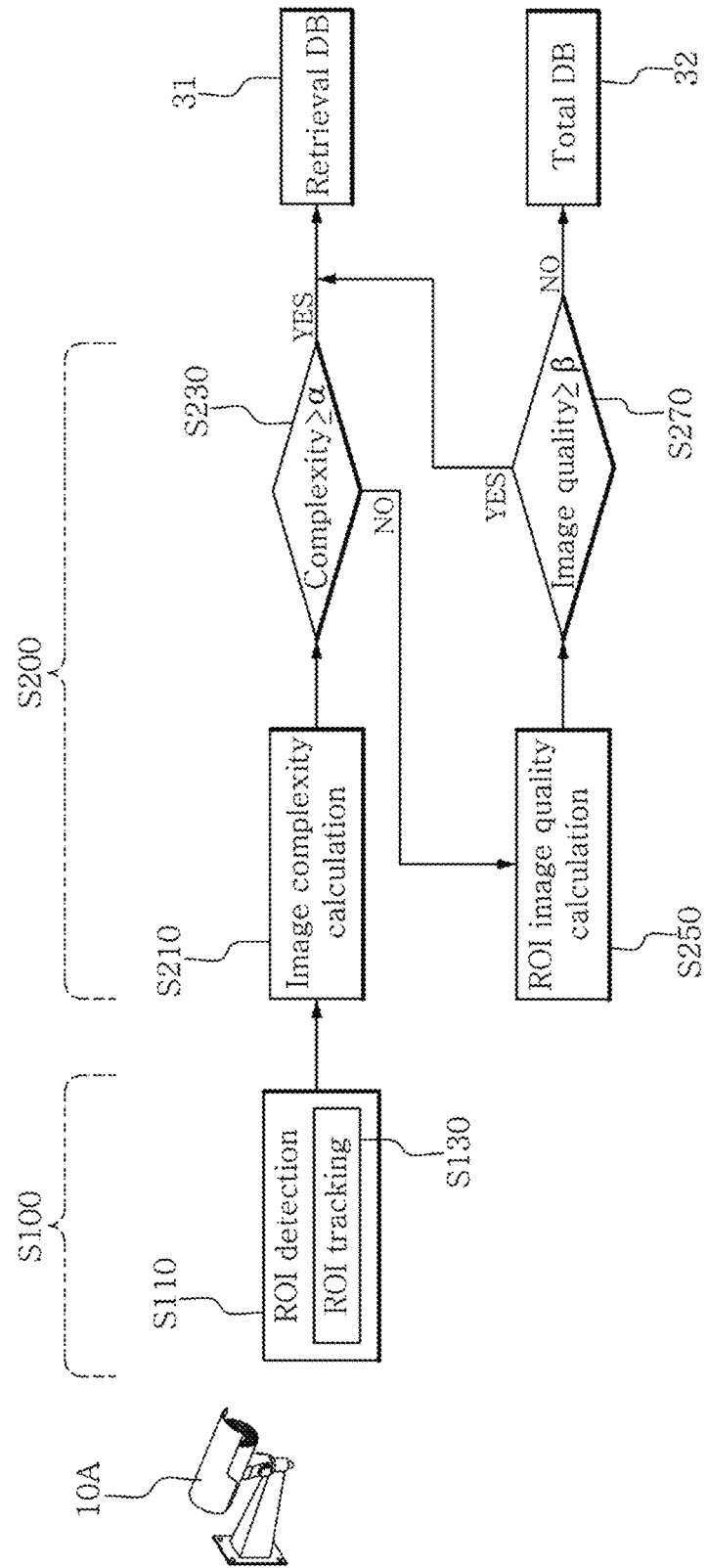
FIG. 6 is a flowchart of a method for selecting an image of interest in an image captured by a single imaging device to construct a retrieval database according to an embodiment of the present disclosure.

FIG. 6 is a flowchart of a method for selecting an image of interest in images captured by a single imaging device to construct a retrieval database according to an embodiment of the present disclosure.

Referring to FIG. 6, the server 20 receives an image from the imaging device 10A and filters an image having an object of interest (S100).

The server 20 detects the object of interest in the received image (S110). In an embodiment, the server 20 may detect the object of interest by detecting a region of interest having at least part of the object of interest (S110).

In some embodiments, the server 20 may further generate tracking information by tracking the detected object of interest (S130). For example, when the server 20 receives a video from the imaging device 10A, the server 20 may generate a tube video composed of regions of interest in each frame by tracking the object of interest included in the video.

In S110 and S130, the detected object of interest (or region of interest) may be extracted as sub image data that is distinguished from the full image.

Additionally, the server 20 further generates detailed information associated with the object of interest detected in S110 and S130 and related data. The detailed information includes, for example, an identifier (for example, a tube ID) of the object of interest, size of the region of interest and a detector used to detect.

The server 20 analyzes complexity of the image in which the object of interest is detected (for example, by the image analysis unit 21) (S210).

In an embodiment, the complexity of the image is analyzed through at least one of a bottom-up approach using spatial information and/or temporal information of the corresponding image and a top-down approach using information related to the detected object of interest (S210).

The complexity analysis result of the image in which the object of interest is detected may be scored with a complexity score and outputted.

The server 20 compares the complexity score with the first threshold (S230). As a result of the comparison, an image having the complexity score that is equal to or higher than the first threshold is selected as the image of interest (S230). In the image having the complexity score that is equal to or higher than the first threshold, the object of interest (for example, all the objects of interest) detected in the corresponding frame is stored in the retrieval database 31 to minimize an error in detection. In an embodiment, the image of interest having the complexity score that is equal to or higher than the first threshold and/or related information is stored in the retrieval database 31.

In an embodiment, the retrieval database 31 is constructed based on image data of the image of interest, identification information of the imaging device, identification information of the image, time information, image data of the object of interest and the object of interest.

In this instance, the server 20 may further perform an additional selection operation on an image having the complexity score that is less than the first threshold. The server 20 analyzes image quality of the region of interest (S250).

In an embodiment, the image quality of the region of interest is analyzed based on at least one of detection accuracy of the object of interest, occlusion in the object of interest within the region of interest and the distance between the imaging device and the object of interest (S250).

The image quality analysis result of the image of the region of interest that is part of the image in which the object of interest is detected may be scored with an image quality score and outputted.

The server 20 compares the image quality score with the second threshold (S270). An image having lower complexity than the first threshold is compared with the second threshold to determine the image quality of the detected object of interest. As a result of the comparison, the image in which the object of interest is detected, having the image quality score that is equal to or higher than the second threshold is selected as the image of interest (S270). When the image quality score of the detected patch is equal to or higher than the second threshold, the detected patch is stored in the retrieval database 31. In an embodiment, the image of interest having the image quality score that is equal to or higher than the second threshold and/or related information is stored in the retrieval database 31. As a result, the images selected based on the first and/or second threshold (e.g., ROI and/or detected patch) are grouped by each tube, and these groups of images are stored in the retrieval database 31.

Based on the retrieval database 31, it is possible to achieve fast retrieval using only the image selected based on the image quality of the object, without retrieving all the images received from the imaging device 10A.

In an embodiment, the server 20 determines a representing image data which represents images included in each group. The representing image data is determined based on at least one of image quality score and complexity score. For example, the most non-complex and highest quality image of corresponding image group is determined as the representing image data. These representing image data also stored in the retrieval database 31.

In an embodiment, the representing image data serve as image ID which is used to identify the corresponding tube. When the server 20 receives a retrieval request including image data of search object, a representing image matching with the image of search object is searched in the retrieval database 31. The server 20 provides matched image data as retrieval result to the user. Additionally, the server 20 further provides at least a part of image data of group associated with the representing image data as the retrieval result to the user. The server 20 stores the unselected remaining image and/or related information in the total database 32 that is a secondary database. When the image quality score of the detected patch is lower than the second threshold, it is stored in the total database 32. In some embodiments, according to the retrieval result of the retrieval database 31, it is provided to the user.

In an embodiment, the total database 32 is constructed based on image data of the unselected remaining image, identification information of the imaging device, identification information of the image and time information. Additionally, when the object of interest is detected in S100, the total database 32 may be constructed further based on related information generated in the process of detecting the region of interest (for example, the detector, the mask of the region of interest, the image quality score of the region of interest, etc.).

Such selection through the above two steps is meaningful in a tracking program for finding a particular object defined by the user.

Image A including multiple objects having the same type as the particular object is worth searching in response to the user's retrieval request in order to track the particular object. The image A has relatively high complexity. When the image A has the complexity score that is equal to or higher than the first threshold, the system 1 stores the image A in the retrieval database 31. To this end, the first threshold is preset to store the image including the multiple objects in the retrieval database 31.

On the other side, image B including a single object having the same type as the particular object has lower complexity than the image A. It is necessary to further determine if the image B is worth searching in response to the user's retrieval request in order to track the particular object. The system 1 determines if the image B is worth retrieving in reliance to the image quality (for example, through the image quality score). An image representing a blurry face due to low image quality has low retrieval probability. When the image B has the image quality score that is equal to or higher than the second threshold, the system 1 stores the image B in the retrieval database 31.

Alternatively, such selection through the two steps is meaningful in an applied program for face recognition.

Assume that the imaging device 10A of the system 1 of FIG. 6 tracks a particular person defined by the user to find him/her. In this assumption, the particular person is already detected as the object of interest.

A frame in which the particular person emerges for the first time is an image having relatively high complexity. The image may have the complexity score that is equal to or higher than the first threshold, and has a possibility that the user will retrieve it later. Accordingly, a first video including this frame is stored in the retrieval database 31.

In some embodiments, a second video including a frame representing a tracking situation after emergence of the particular person may be further stored in the retrieval database 31. The second video is determined based on the tracking result of the object of interest detection unit 21.

In the above assumptions, the particular object is a person, but it will be obvious to those skilled in the art that the particular object is not limited thereto. For example, the particular object may be a car.

The selection of step 2 is meaningful in abnormal behavior detection. Assume a situation in which the imaging device 10A of the system 1 of FIG. 6 images a car running on a road, hitting a wall and stopping. The accident video will be stored in the retrieval database 31 since there is a high possibility that the user will retrieve it later.

The server 20 receives the first video including the frame representing the driving situation before crash and the second video including the frame representing the stop situation after crash from the imaging device 10A.

As the car travels in the first video section, each frame that makes up the first video has higher complexity than the first threshold (S200). Accordingly, frame data of the first video, each frame identification information, time and information associated with the car that is the object of interest is stored in the retrieval database 31. In general, it is because an accident process is the most important in the accident video.

In contrast, the car or the object of interest may be detected in the frames of the second video representing a scene in which the car is stopped after crash, but since the car is stopped, the frames of the second video may have complexity that is less than the first threshold.

However, some frames of the second video may correspond to an image having low complexity but enough worth further providing when the user retrieves the accident video later. It is because the user is more likely to desire various and accurate information about the accident situation. Accordingly, it suffices if the second video is provided to the user with high image quality even though the second video has relative low complexity.

Accordingly, the system 1 may provide a richer image retrieval service by selecting the image of interest based on the complexity of the entire image and/or the image quality of the object of interest and constructing the retrieval database.

Additionally, the retrieval database 31 may be constructed by selecting the image of interest in the images captured by multiple imaging devices 10A, 10B, . . . , 10N.

Figure 7:
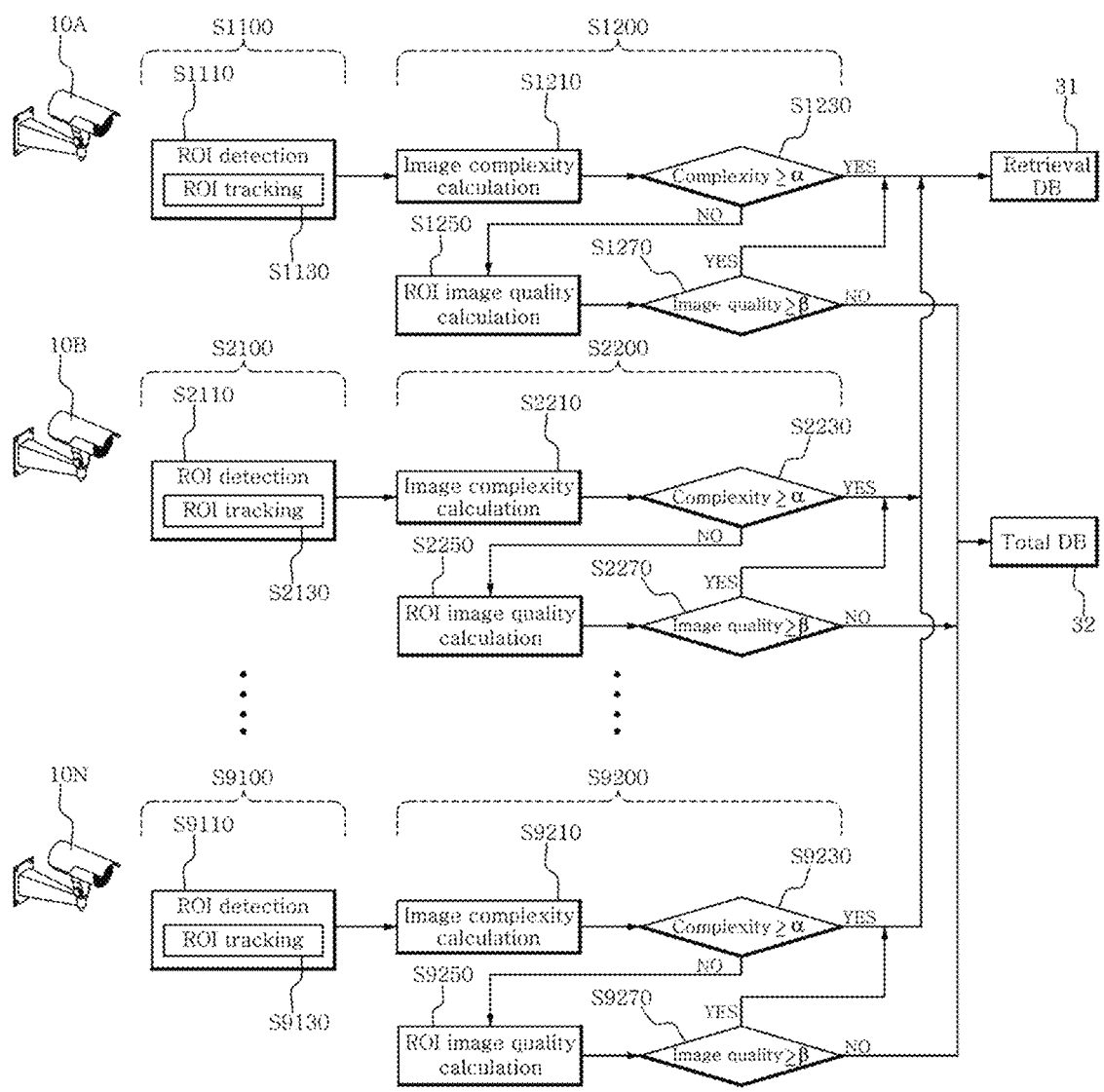
FIG. 7 is a flowchart of a method for selecting an image of interest in images captured by multiple imaging devices to construct a retrieval database according to an embodiment of the present disclosure.

FIG. 7 is a flowchart of a method for selecting an image of interest in images captured by multiple imaging devices to construct a retrieval database according to an embodiment of the present disclosure.

Referring to FIG. 7, the server 20 receives first to Nth images respectively captured by imaging devices 10A, 10B, . . . 10N.

The server 20 detects an object of interest in a first image (S1100). When the object of interest is detected, the server 20 analyzes complexity of the first image in which the object of interest is detected (S1210), and determines if the first image corresponds to an image worth selecting at a macro level (S1230).

The server 20 analyzes image quality of the region of interest in an unselected image as a result of the determination based on complexity (S1250), and determines if the first image corresponds to an image worth selecting at a micro level (S1270).

The server 20 performs the selection operation on the second image (S2100 and S2200) to the Nth image (S9100 and S9200).

The process of selecting the image of interest of FIGS. 6 and 7 may be variously modified. The same analysis and selection process may not be applied to all the images received from each imaging device 10. Additionally, the sequence of some steps may be differently changed, or some steps may be performed at the same time.

Figure 8:
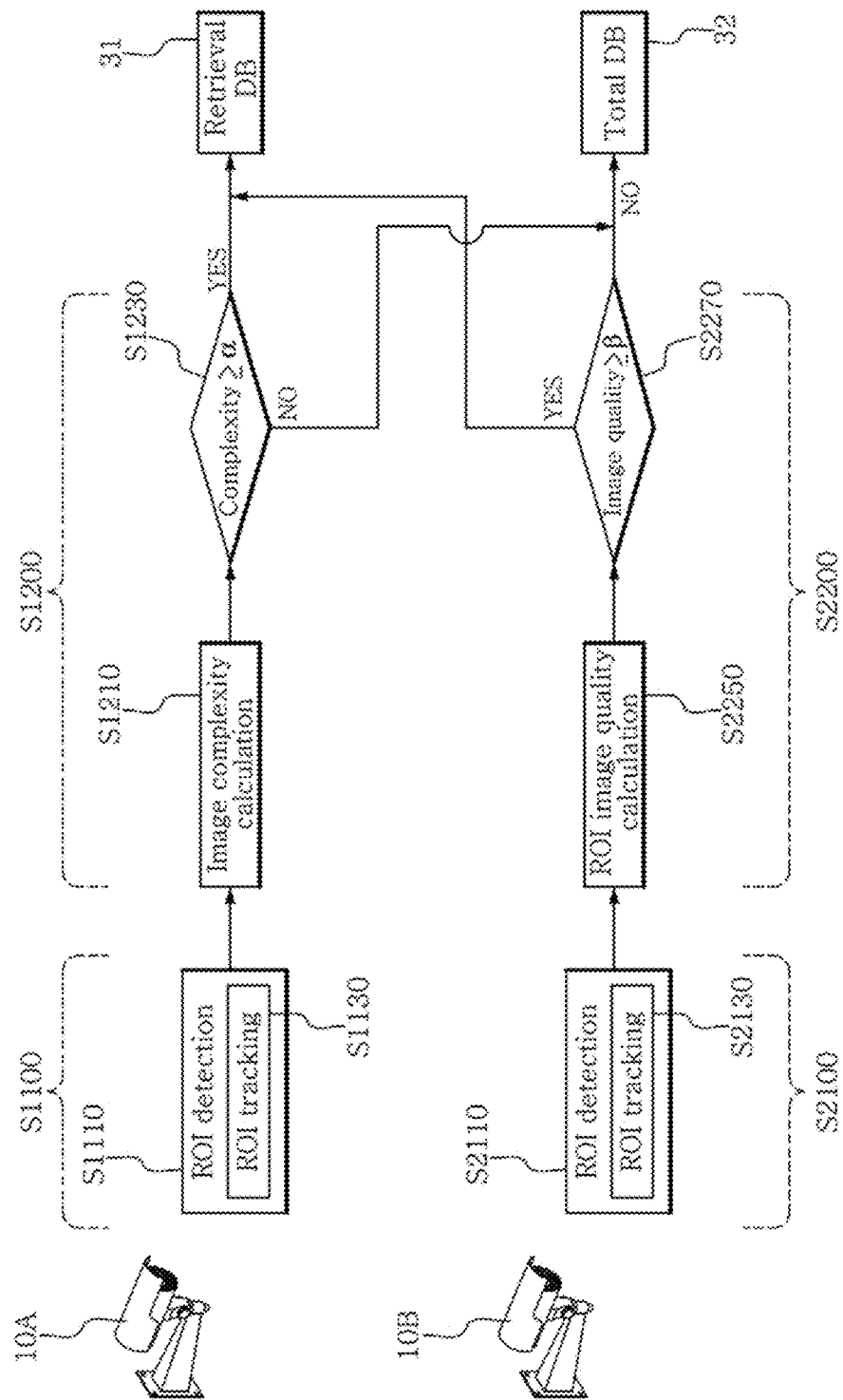
FIGS. 8 to 10 are flowcharts of methods for selecting an image of interest in images captured by multiple imaging devices to construct a retrieval database according to other embodiments of the present disclosure.

FIG. 8 is a flowchart of a method for selecting an image of interest in images captured by multiple imaging devices to construct a retrieval database according to another embodiment of the present disclosure.

Referring to FIG. 8, the server 20 may perform different selection operations for each image received from each imaging device 10A and 10B.

As shown in FIG. 8, the server 20 may be configured to select an image of interest in the image of the imaging device 10A based on complexity analysis (S1100 to S1200), and select an image of interest in the image of the imaging device 10B based on image quality analysis of an object of interest (S2100 to S2200).

In an embodiment, the selection operation for each imaging device 10A or 10B may be set based on the location or specifications of the imaging device 10A or 10B.

In an example, when complexity is more important in the analysis of images in the coverage area of the imaging device 10A, the server 20 may be configured to only perform complexity analysis in the image of the imaging device 10A (S1100 to S1200).

In other example, when the imaging device 10B can acquire a high quality image because of having higher specifications, the server 20 may be configured to only perform image quality analysis of the object of interest in the image of the imaging device 10B (S2100 to S2200).

Figure 9:
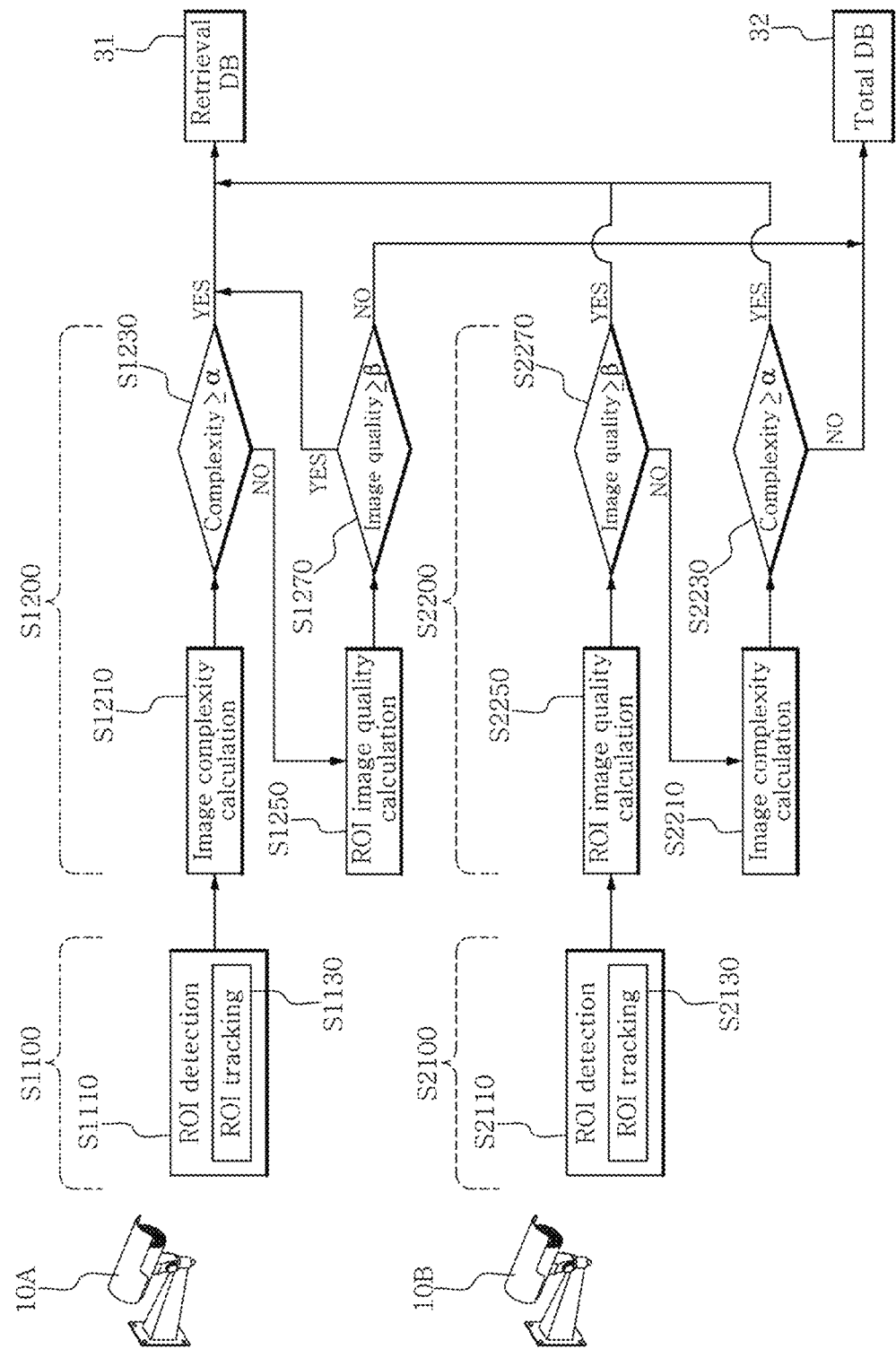

FIG. 9 is a flowchart of a method for selecting an image of interest in images captured by multiple imaging devices to construct a retrieval database according to still another embodiment of the present disclosure.

Referring to FIG. 9, the server 20 may be configured to perform a selection operation on an image received from at least one imaging device (for example, 10B) based on image quality analysis of an object of interest (S2250 and S2270), and then a selection operation based on complexity analysis of the image (S2210 and S2230).

Figure 10:
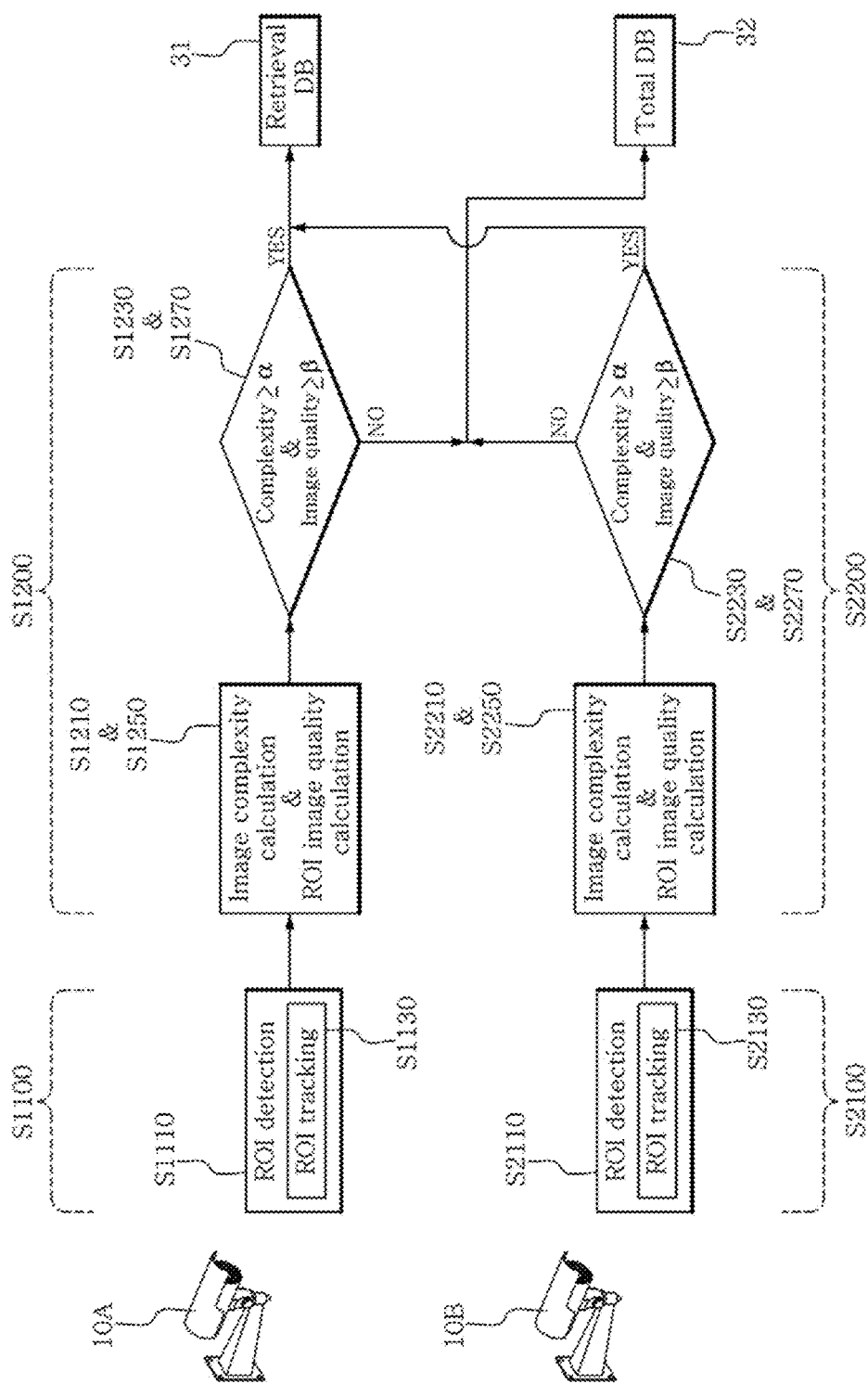

FIG. 10 is a flowchart of a method for selecting an image of interest in images captured by multiple imaging devices to construct a retrieval database according to yet another embodiment of the present disclosure.

Referring to FIG. 10, the server 20 may perform an image complexity analysis operation (S1210 and S2210) and an image quality analysis operation of an object of interest (S1250 and S2250) at the same time. In some embodiments, a selection operation based on the image complexity analysis result (S1230 and S2230) and a selection operation based on the image quality analysis result of the object of interest (S1270 and S2270) may be also performed at the same time.

The analysis and selection operations of FIGS. 8 to 10 are described above, and a detailed description is omitted herein.

The system 1 of FIGS. 8 to 10 is shown as including only two imaging devices 10A, 10B, but this is shown for illustration purposes only. It will be obvious to those skilled in the art that the system 1 of FIGS. 8 to 10 may include two or more imaging devices 10.

As described above, the method for selecting the image of interest for constructing the image control system 1 or the retrieval database is not limited to simply detecting a search target candidate, i.e., the object of interest, and selecting the object of interest by further analyzing the image including the object of interest at a macro level and/or a micro level to construct the retrieval database.

Accordingly, when the image control system 1 provides the user with a retrieval service for retrieving an image stored in the database, the user using the retrieval service may retrieve faster. Further, a higher quality image retrieval service may be provided.

The operation of the image control system 1 and the method for selecting an image of interest to construct a retrieval database according to embodiments as described above may be, at least in part, implemented as a computer program and recorded in computer-readable recording media. For example, the operation of the image control system 1 and the method for selecting an image of interest to construct a retrieval database according to embodiments may be implemented together with program products composed of computer-readable media including program code, and executed by a processor for performing any or all of the above-described steps, operations or processes.

The computer may be a computing device such as a desktop computer, a laptop computer, a notebook, a smartphone or the like, and may be any integrated device. The computer is a device having at least one alternative and special purpose processor, memory, storage space and networking component (either wireless or wired). The computer may execute an operating system (OS) such as for example, OS that is compatible with Microsoft Windows, Apple OS X or iOS, Linux distribution, or Google Android OS.

The computer-readable recording media include all types of recording devices in which computer-readable data is stored. Examples of the computer-readable recording media are ROM, RAM, CD-ROM, magnetic tape, floppy disk, and optical data storage devices. Additionally, the computer-readable recording media is distributed over computer systems connected via a network, and may store and execute the computer-readable codes in a distributed manner. Additionally, functional programs, codes and code segments for realizing this embodiment will be easily understood by those having ordinary skill in the technical field to which this embodiment belongs.

While the present disclosure has been hereinabove described with reference to the embodiments shown in the drawings, this is provided for illustration purposes only and it will be appreciated by those having ordinary skill in the art that various modifications and variations may be made thereto. However, it should be noted that such modifications fall within the technical protection scope of the present disclosure. Therefore, the true technical protection scope of the present disclosure should be defined by the technical spirit of the appended claims.

The image control system according to an aspect of the present disclosure constructs a retrieval database that selects an image of interest in large scale input images based on the macro analysis result and/or the micro analysis result, and first performs image retrieval on the selected image of interest.

Currently, with the development of CCTV camera specifications, it is easy to acquire large scale high quality images, and it is possible to acquire a few hundred or thousand images to a few ten thousand images per second. Accordingly, the image control system necessarily receives and processes large scale images. The image control system of the present disclosure performs the object of interest detection process, the macro analysis process of the entire image or the micro analysis process of image quality of the object of interest using various CNN models pre-trained through one of the fourth industrial revolution technologies, machine learning, and thus can check a few hundred thousand images to find a particular person. Further, the image control system of the present disclosure has high applicability in large scale imaging systems by selecting images substantially required for image retrieval.

What is claimed is:

1. A method for selecting an image of interest to construct a retrieval database, performed by a computing device including a processor, the method comprising:
receiving an image captured by an imaging device;
detecting an object of interest in the received image;
selecting an image of interest based on at least one of complexity of the image in which the object of interest is detected and image quality of the object of interest, wherein selecting the image of interest comprises calculating an image quality score of the object of interest based at least in part on a detection accuracy of the object of interest, wherein the detection accuracy of the object of interest is calculated based on the percent of the object of interest included in a region of interest, a ratio between background and foreground in the region of interest, and a blur of the region of interest; and
storing information related to the image of interest in the retrieval database,
wherein the selecting the image of interest further comprises:
calculating a complexity score of the image by analyzing the entire image in which the object of interest is detected,
wherein the complexity score increases as a total number of objects in the entire image increases,
wherein the image includes a first image and a second image received after the first image,
both the first image and the second image include the object of interest, and
the processor selects the second image as the image of interest when the first image has the complexity score that is equal to or higher than a first threshold and the second image has the complexity score that is lower than the first threshold and the image quality score that is equal to or higher than a second threshold.

2. The method for selecting an image of interest to construct a retrieval database according to claim 1, wherein the selecting the image of interest further comprises:
comparing the complexity score of the image with the first threshold, and selecting an image having the complexity score that is equal to or higher than the first threshold as the image of interest.

3. The method for selecting an image of interest to construct a retrieval database according to claim 1, wherein the selecting the image of interest comprises:
calculating the image quality score of the region of interest including at least part of the object of interest in the image in which the object of interest is detected; and
comparing the image quality score of the region of interest of the image with the second threshold, and selecting an image having the image quality score that is equal to or higher than the second threshold as the image of interest.

4. The method for selecting an image of interest to construct a retrieval database according to claim 1, wherein the selecting the image of interest comprises:
comparing the complexity score of the image with the first threshold;
calculating the image quality score of the region of interest including at least part of the object of interest in the image in which the object of interest is detected;

comparing the image quality score of the region of interest of the image with the second threshold; and selecting, as the image of interest, an image having the complexity score that is equal to or higher than the first threshold or an image having the image quality score that is equal to or higher than the second threshold.

5. The method for selecting an image of interest to construct a retrieval database according to claim 1, wherein the complexity score of the image is calculated through at least one of a bottom-up approach using at least one of spatial information and temporal information of the image and a top-down approach using information related to the detected object of interest.

6. The method for selecting an image of interest to construct a retrieval database according to claim 1, wherein the receiving the image comprises receiving a third image captured by a first imaging device and a fourth image captured by a second imaging device.

7. The method for selecting an image of interest to construct a retrieval database according to claim 6, wherein the selecting the image of interest comprises selecting the image of interest based on complexity of the third image and image quality of the object of interest of the fourth image, when the object of interest is detected in the third image and the fourth image.

8. The method for selecting an image of interest to construct a retrieval database according to claim 6, wherein the selecting the image of interest comprises selecting the image of interest based on complexity of the third image, image quality of the object of interest of the third image, complexity of the fourth image and image quality of the object of interest of the fourth image, when the object of interest is detected in the third image and the fourth image.

9. A non-transitory computer-readable recording medium that is readable by a computing device and stores program instructions executable by the computing device, and when the program instructions are executed by a processor of the computing device, the program instructions cause the processor to:

receive an image captured by an imaging device;
detect an object of interest in the received image;
select an image of interest based on at least one of complexity of the image in which the object of interest is detected and image quality of the object of interest, wherein selecting the image of interest comprises calculating an image quality score of the object of interest based at least in part on a detection accuracy of the object of interest, wherein the detection accuracy of the object of interest is calculated based on the percent of the object of interest included in a region of interest, a ratio between background and foreground in the region of interest, and a blur of the region of interest; and
store information related to the image of interest in a retrieval database,
wherein the selecting the image of interest further comprises:
calculating a complexity score of the image by analyzing the entire image in which the object of interest is detected,
wherein the complexity score increases as a total number of objects in the entire image increases,
wherein the image includes a first image and a second image received after the first image,
both the first image and the second image include the object of interest, and
the program instructions cause the processor to select the second image as the image of interest when the first image has the complexity score that is equal to or higher than a first threshold and the second image has the complexity score that is lower than the first threshold and the image quality score that is equal to or higher than a second threshold.

10. An image control system, comprising:
at least one imaging device that images an object and a background;
a server that selects, as an image of interest, an image having a possibility that a user will retrieve later the image received from the imaging device, wherein the image of interest is selected based at least in part on a complexity of the image, wherein selecting the image of interest comprises calculating an image quality score of an object of interest based at least in part on a detection accuracy of the object of interest, wherein the detection accuracy of the object of interest is calculated based on the percent of the object of interest included in a region of interest, a ratio between background and foreground in the region of interest, and a blur of the region of interest; and
a first database constructed using the image of interest,
wherein the selecting the image of interest further comprises:
calculating a complexity score of the image by analyzing the entire image in which the object of interest is detected,
wherein the complexity score increases as a total number of objects in the entire image increases,
wherein the image includes a first image and a second image received after the first image,
both the first image and the second image include the object of interest, and
the server selects the second image as the image of interest when the first image has the complexity score that is equal to or higher than a first threshold and the second image has the complexity score that is lower than the first threshold and the image quality score that is equal to or higher than a second threshold.

11. The image control system according to claim 10, further comprising a second database constructed using an image that is not selected as the image of interest in the received image.

* * * * *